United States Patent
Sattler et al.

(10) Patent No.: US 11,846,712 B2
(45) Date of Patent: Dec. 19, 2023

(54) MICROSERVICES ARCHITECTURE FOR CLOUD-SCALE GLOBAL NAVIGATION SATELLITE SYSTEM

(71) Applicant: Verizon Patent and Licensing Inc., Basking Ridge, NJ (US)

(72) Inventors: Lee E. Sattler, Mt. Airy, MD (US); Ashish Sardesai, Ashburn, VA (US); Mani Tadayon, Leesburg, VA (US); Dante J. Pacella, Charles Town, WV (US); Saravanan Mallesan, Fairfax, VA (US); Venkata Josyula, Ashburn, VA (US); Christopher N. Delregno, Rowlett, TX (US); Jean M. McMANUS, Bernardsville, NJ (US); Mohammed M. Rahman, Allen, TX (US); Matthew W. Turlington, Richardson, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 86 days.

(21) Appl. No.: 17/249,739

(22) Filed: Mar. 11, 2021

(65) Prior Publication Data
US 2021/0199810 A1    Jul. 1, 2021

Related U.S. Application Data

(63) Continuation of application No. 15/967,182, filed on Apr. 30, 2018, now Pat. No. 10,955,557.

(51) Int. Cl.
*G01S 19/07* (2010.01)
*G01S 19/48* (2010.01)
*G01S 19/43* (2010.01)

(52) U.S. Cl.
CPC .............. *G01S 19/07* (2013.01); *G01S 19/48* (2013.01); *G01S 19/43* (2013.01)

(58) Field of Classification Search
CPC .......... G01S 19/07; G01S 19/48; G01S 19/43
USPC .................. 342/357.23, 357.25, 352, 357.41
See application file for complete search history.

(56) References Cited

U.S. PATENT DOCUMENTS

| 9,231,740 B2 * | 1/2016 | Ranjan .................... H04L 1/244 |
| 10,716,086 B2 | 7/2020 | Del Regno et al. |
| 2010/0156713 A1 * | 6/2010 | Harper .................... G01S 19/25 |
| | | 342/357.25 |
| 2018/0192233 A1 * | 7/2018 | Del Regno ........... G01S 19/071 |

* cited by examiner

Primary Examiner — Bo Fan (57) ABSTRACT

A system can include a producer device to receive reference data from a reference station. The system can include a queue device to store a reference message, corresponding to the reference data, in a message queue. The system can include a mapping device to store mapping information indicating that the message queue is associated with the reference station. The system can include a consumer device to identify the message queue as being associated with a microservice to be provided to a client device based on a microservice request. The message queue can be identified based on the mapping information. The consumer device can obtain the reference message from the message queue, generate corrections data associated with the client device, and provide the corrections data.

20 Claims, 6 Drawing Sheets

MICROSERVICES ARCHITECTURE FOR CLOUD-SCALE GLOBAL NAVIGATION SATELLITE SYSTEM

RELATED APPLICATION

This application is a continuation of U.S. patent application Ser. No. 15/967,182 entitled "MICROSERVICES ARCHITECTURE FOR CLOUD-SCALE GLOBAL NAVIGATION SATELLITE SYSTEM," filed Apr. 30, 2018 (now U.S. Pat. No. 10,955,557), which is incorporated herein by reference in its entirety.

BACKGROUND

Global Navigation Satellite System (GNSS) is a generic term for a satellite navigation system that provides autonomous geo-spatial positioning with global coverage. The most ubiquitous of these technologies is the Global Positioning System (GPS).

DETAILED DESCRIPTION OF PREFERRED EMBODIMENTS

The following detailed description of example implementations refers to the accompanying drawings. The same reference numbers in different drawings can identify the same or similar elements.

A GPS signal in space provides a worst-case pseudo-range accuracy of 7.8 meters at a 95% confidence level, before any terrestrial biases, or errors, are introduced, such as ionospheric delay, tropospheric delay, receiver noise, receiver clock errors, signal multipath, and/or the like. These errors can introduce further inaccuracy and/or imprecision (e.g., by several meters).

This level of inaccuracy and imprecision can be tolerated in some applications. For example, a driver of a vehicle can be directed to a wrong side of a building, a block away from a target location, and/or the like, but such inaccuracy and imprecision can be overcome in practice (e.g., when the driver can circle the building, when the driver can see the target location despite being inaccurately directed, and/or the like). However, in many other applications, these limitations could lead to catastrophic results. For example, in an autonomous vehicle application these limitations can result in an autonomous vehicle not being in a right lane to make a turn or pick up a passenger, the autonomous vehicle identifying a curb as a street, the autonomous vehicle drifting into oncoming traffic, and/or the like. Other examples of applications in which such inaccuracy or imprecision cannot be tolerated include autonomous drones, mobile robotics, precision advertising, and many others.

Real-Time Kinematics (RTK) is one solution that allows for GNSS corrections to vastly improve location positioning. RTK leverages a phase of a carrier, without regard to information modulated on the carrier and, as such, can provide greater accuracy, approaching millimeter precision. RTK relies on fixed and well-surveyed reference stations to transmit corrections data to in-range RTK-enabled receivers. Because a given reference station is well-surveyed, an actual position of the reference station is known. Here, the reference station receives satellite data from a group of (e.g., five or more) satellites, and then determines corrections data needed to adjust a given satellite's estimated signal location in order to provide a true location. These corrections against the reference station are used by the RTK-enabled receivers to make similar adjustments.

With RTK, accuracy and precision is high within approximately 2 kilometers (km) of the reference station, and can be acceptable within 10 km. In many locations, acceptable adjustments can be obtained within 40 km of the reference station (e.g., depending on changes in topography, atmospheric conditions, and/or the like). A typical reference station can accommodate only a few concurrent sessions on the reference station. Further, RTK was developed with terrestrial and hydrographic surveying in mind. Thus, since its inception, precision farming and civil engineering use cases have been developed. However, these are niche use cases without great scalability and/or flexibility demands.

Networked Transport of RTCM via Internet Protocol (NTRIP), enables a mobile RTK-enabled receiver (sometimes referred to as a rover or a client) to access corrections data from a reference station over the Internet. Here, the corrections data is in the RTCM format, which is a standard developed by the Radio Technical Commission for Maritime Services. An NTRIP caster (herein referred to as a caster) is a device that is capable of supporting multiple, simultaneous access to corrections data associated with a given reference station. The caster can also provide security (e.g., through user authentication), management of connected clients, and create mountpoints (i.e., a virtual representation of a reference station that a client can connect to) in order to uniquely identify different sources of corrections data available to clients. Some casters are capable of using a cellular network in order to boost a range of corrections data to a client. Nonetheless, no solution exists that provides capability for providing corrections data to hundreds or thousands of concurrent receivers in a highly elastic, highly resilient cloud-scale environment.

Some implementations described herein provide a microservices architecture that provides a sink for storing and/or processing reference station data and a source for providing corrections data or location data to a large scale, geographically distributed group of client devices. In some implementations, the microservices architecture allows the various functions of a typical caster to be independently scaled (e.g., reference stations can number in the hundreds, while clients can number in the millions) such that a number of microservices (e.g., a correction microservice, a location microservice, and/or one or more other types of microservice) can be scaled independently and efficiently on the same (e.g., cloud-based) platform, as described in further detail below.

Figure 1:
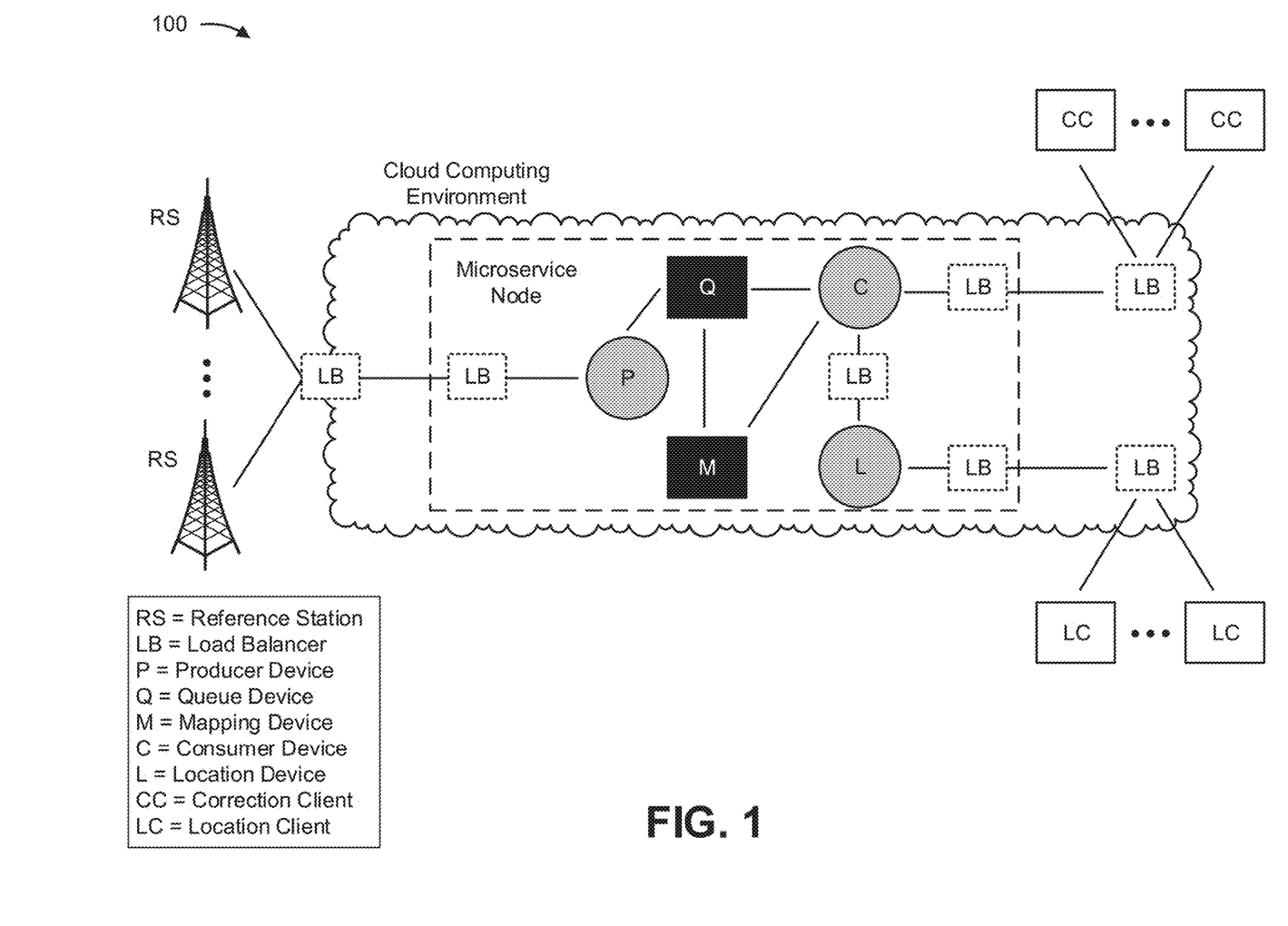
FIG. 1 is a diagram of an overview of an example implementation of a microservice node architecture described herein.

FIG. 1 is a diagram of an overview of an example implementation 100 of a microservice node architecture described herein.

A microservice can include a service that provides an accuracy of location to within centimeters (hyper accuracy) for a client device (which is not capable of being provided by GPS systems). This can improve performance of the client device, an application associated with the client device (e.g., a ride share application, an application associated with autonomous operation, and/or the like), and/or a service provided to a user of the client device (e.g., a ride sharing service, an autonomous navigation service, and/or the like).

The microservice can include, for example, a corrections microservice. The corrections microservice is a microservice for supplying a client device (e.g., a corrections client) with corrections data that can be used to correct a location of the client device, as observed by the client device (herein referred to as an observed location). The client device can use the corrections data, along with other observables, to calculate a comparatively more accurate and/or precise geolocation (e.g., as compared to using other GPS methods). In some implementations, in order obtain the appropriate corrections data, the client device can provide information that identifies a requested mountpoint (e.g., information that identifies a particular reference station known to be within range of the client device), information that identifies the observed location, information that identifies an estimated location of the client device (e.g., a location determined based on observables of the client device), and/or the like, as described herein. The corrections microservice offers the capability for client devices to determine an actual location of the client device (e.g., a highly accurate and/or precise location, within centimeters of a true location).

As another example, the microservice can include a location microservice. The location microservice is a microservice for supplying a client device (e.g., a location client) with information that identifies an actual location of the client device (e.g., based on information that identifies an observed or estimated location of the client device). The location microservice offers the capability for the client device to receive information that identifies the actual location of the client device (rather than receiving corrections data). The location microservice uses observables from the client device and correction data from the correction microservice in order to calculate an actual (e.g., correct, precise) location of the client device, and sends information that identifies the actual location to the client device to the client device. As such, the location microservice offers the capability for the client device to offload calculation of the actual location to the microservice node, thereby conserving resources of the client device (e.g., processor resources, battery power, memory resources, and/or the like). In some implementations, the microservice node can allow for provisioning of one or more other types of microservice, as described below.

In some implementations, such microservices can be provided by a microservice node. A microservice node includes a system (e.g., one or more devices) capable of providing one or more microservices to one or more client devices (e.g., one or more corrections clients, one or more location clients, and/or the like). In some implementations, microservice node can be at least partially implemented in a cloud computing environment, as shown.

As shown in FIG. 1, the microservice node architecture can include a producer device, a queue device, a mapping device, a consumer device, a location device, and a group of load balancers. As indicated in FIG. 1, the microservice node can be arranged to communicate with a set of reference stations and a set of client devices (e.g., a set of corrections clients and/or location clients).

The producer device includes a device arranged to receive reference data from one or more reference stations. The reference data can include, for example, raw pseudo range observations and phase range observations received by a reference station. In some implementations, the microservice node (e.g., the consumer device) can calculate corrections data (sometimes referred to as location error information or a location correction) based on the reference data, as described below. In one example, the corrections data can include information associated with terrestrial biases or errors, such as ionospheric delay, tropospheric delay, receiver noise, receiver clock errors, signal multipath, and/or the like.

In some implementations, the producer device can be arranged to receive (e.g., via one or more load balancers) reference data from one or more reference stations, and to provide the reference data to a queue device. In some implementations, the producer device can receive reference data (e.g., using the NTRIP protocol) from a given reference station on a periodic basis (e.g., the producer device can receive one instance of reference data every second). In other words, the producer device can receive a stream of reference data from the given reference station. In some implementations, the producer device can monitor a status and/or an activity level of an associated reference station (e.g., in order to ensure that reference data arrives within a predetermined or configured interval). As shown in FIG. 1, the producer device can be arranged to provide the reference data to a queue device.

The queue device includes a device to store a reference message, corresponding to an instance of reference data received from the producer device, in a message queue. In some implementations, the queue device can receive reference data from the producer device, and can store a reference message, corresponding to the reference data, in a message queue. In some implementations, the queue device can operate to provide translation from the NTRIP protocol to another format and/or format used by the microservice node (e.g., the queue device can translate the reference data from a NTRIP format to a reference message that is differently formatted). In some implementations, a given message queue can be assigned to store reference messages associated with a particular reference station or set of reference stations.

In some implementations, multiple queues can be configured on the queue device, each storing reference messages associated with a respective reference station from which the producer device receives reference data. In some implementations, mapping information, associating a given message queue with its corresponding reference station, can be stored and/or maintained by a mapping device.

The mapping device includes a device to store mapping information associated with message queues of a queue device. In other words, the mapping device includes a device to store information that identifies a message queue that stores reference messages associated with a given reference station. In some implementations, the mapping device can act as a centralized device for maintaining mapping information, information that identifies locations of reference stations, configuration information, message queue and/or reference station naming, providing distributed synchronization, providing group services, and/or the like.

As further shown, the queue device and the mapping device can be arranged to provide information to and/or receive information from a consumer device. The consumer device includes a device to receive a microservice request associated with a microservice to be provided to a client device (e.g., a corrections client, a location client, and/or the like), identify a message queue from which to obtain a reference message, obtain the reference message from the identified message queue, generate corrections data based on the reference message, and provide the reference data in association with providing the microservice.

In some implementations, when the microservice request is associated with the corrections microservice (e.g., when a corrections client provides a request for the corrections microservice), the consumer device can receive the microservice request from the corrections client (e.g., via one or more load balancers). Alternatively, when the microservice request is associated with the location microservice (e.g., when a location client provides a request for the location microservice), the consumer device can receive the microservice request from a location device of the microservice node (e.g., via one or more load balancers).

In some implementations, the consumer device can use location information, associated with a given client device (e.g., information that identifies an observed or estimated location of a corrections client or a location client), in order to identify a message queue from which to obtain a reference message associated with providing the microservice. For example, the consumer device can receive a microservice request including information that identifies an observed location of a client device, and can identify (e.g., based on information stored by the consumer device and/or the mapping device) a reference station that is closest to or within a threshold distance of (e.g., 1 km, 2 km, and/or the like) of the client device. Next, the consumer device can identify (e.g., based on mapping information stored by the mapping device) a message queue corresponding to the identified reference station, and can obtain a stored reference message (e.g., a most recently stored reference message, set of stored reference messages, and/or the like).

In some implementations, the consumer device can subscribe to the message queue (e.g., such that the consumer device automatically receives additional references messages, associated with the identified reference station, stored by the message queue). In some implementations, the consumer device can change the subscription to a different message queue if later-received (e.g., periodic) location information sent by the client device indicates that another reference station is more appropriate than the current reference station (e.g., when the client device moves to a new geographic location, when the current reference station fails, and/or the like). In some implementations, the transfer of reference data streams during a change of subscription can be conducted such that latency, associated with the microservice, is minimized or eliminated.

In some implementations, upon obtaining the reference message from the appropriate message queue, the consumer device can calculate or otherwise determine corrections data based on the reference message. In some implementations, when the microservice request is a corrections microservice request, the consumer device can provide the corrections data to the corrections client associated with the microservice request (e.g., such that the corrections client can correct an observed location). The corrections client can then correct the observed location based on the corrections data in order to determine an actual location of the corrections client.

Alternatively, when the microservice request is a location microservice request, the consumer device can provide the corrections data to the location device. The location device is a device arranged to receive corrections data associated with a location microservice request. The location device can then determine, based on the corrections data, an actual location of a location client, and provide information that identifies the actual location of the location client. In other words, when provisioning the location service, the microservice node can determine the actual location of the location client (rather than requiring the location client to determine the actual location). In some implementations, the location device can determine the actual location based on the corrections data and the observed and/or estimated location of the location client. In some implementations, the location device can be arranged to receive microservice requests associated with the location microservice, as shown in FIG. 1.

Notably, while a single microservice node is shown in FIG. 1, multiple microservice nodes can be configured (e.g., multiple microservice nodes can be configured on computing resources of the cloud computing environment). In some implementations, one or more microservice nodes can form a hyper accuracy location platform. In other words, one or more microservice nodes can, collectively, operate as a hyper accuracy location platform such that microservices can be provided to hundreds, thousands, or even millions of client devices based on reference data from hundreds or thousands of reference stations.

Further, FIG. 1 illustrates a microservice node as including a single producer device, a single queue device, a single mapping device, a single consumer device, and a single location device. However, in some implementations, a given microservice node can include one or more of each of these devices. In other words, in practice, a given microservice node can include one or more producer devices, one or more queue devices, one or more mapping devices, one or more consumer devices, and/or one or more location devices. In some implementations, load balancers can be appropriately arranged in order to balance traffic between one or more microservice nodes, one or more producer devices, one or more queue devices, one or more mapping devices, one or more consumer devices, and/or one or more location devices.

In some implementations, this architecture of the microservice node allows functions of a typical NTRIP caster to be independently scaled, thereby allowing microservices, provided by one or more microservice nodes, to scale independently and efficiently to a virtually unlimited size. Further, the architecture of the microservice node allows for implementation of a fault detection, isolation and recovery (FDIR) paradigm that restricts faults (e.g., to a single client device instance), thereby eliminating any system-wide outages due to client device faults and/or infrastructure faults (e.g., faults of one or more devices of a given microservice node). This also enables operational efficiencies in terms of software management and speed of diagnostic processes.

Additionally, because of the high degree of flexibility afforded by the architecture of the microservice node, one or more other microservices (in addition to a corrections microservice and a location microservice) can be provided. Such microservices can include, for example, a microservice associated with extrapolation of a location of a client device against a three-dimensional model of an immediate vicinity of the client device (e.g., in order to compensate for multipath inflections), a microservice associated with improving accuracy and/or precision of a calculated location in an urban canyon, a microservice associated with providing route and/or path analytics (e.g., in order to improve efficiency in an area such as advertising, transportation, traffic, or swarm management), and/or the like.

As indicated above, FIG. 1 is provided merely as an example. Other examples are possible and can differ from what was described with regard to FIG. 1.

Additional details regarding a hyper accuracy location platform can be found in U.S. patent application Ser. No.

15/693,004, filed on Aug. 31, 2017, the content of which is incorporated by reference herein in its entirety.

Figure 2A:
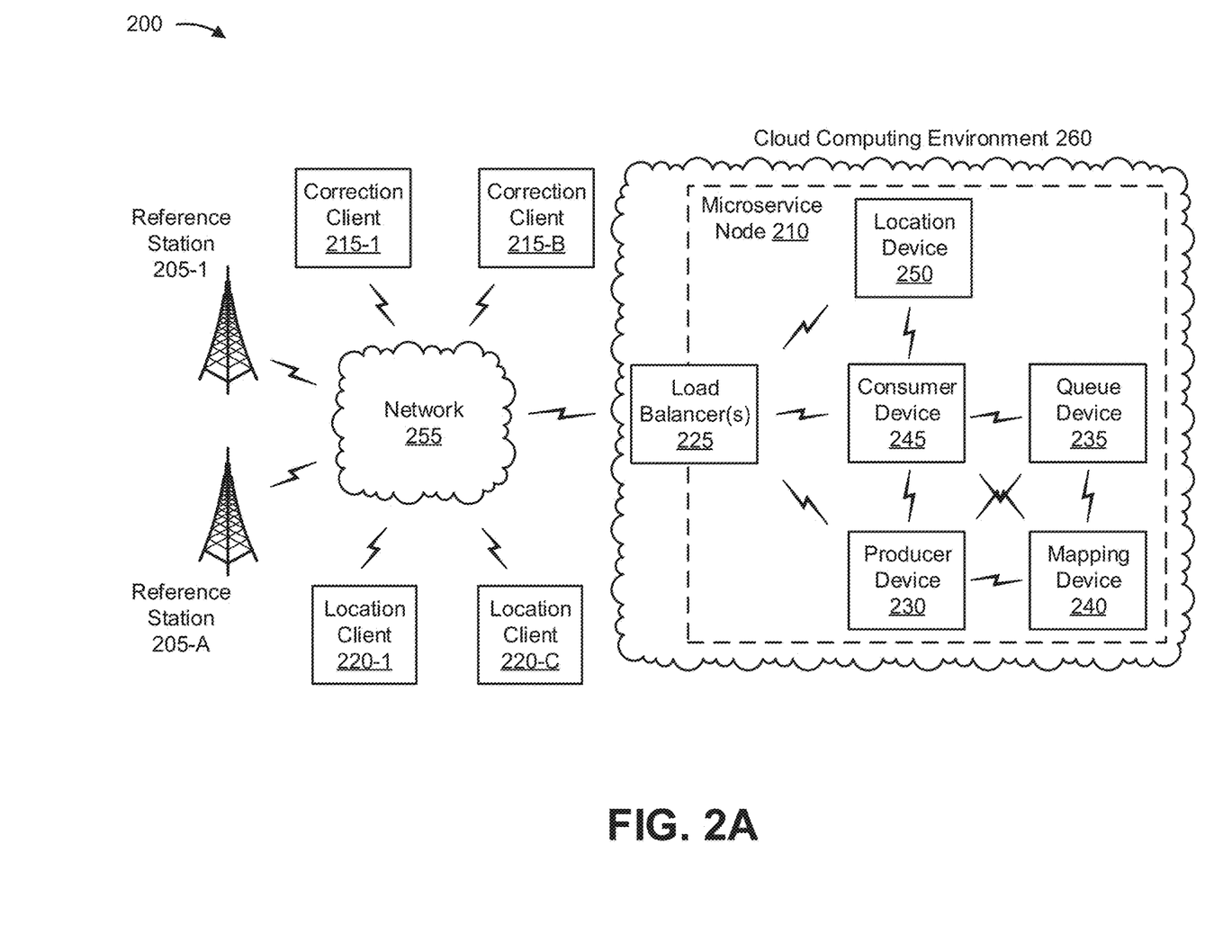
FIGS. 2A and 2B are diagrams associated with an example environment in which systems and/or methods, described herein, can be implemented.
Figure 2B:
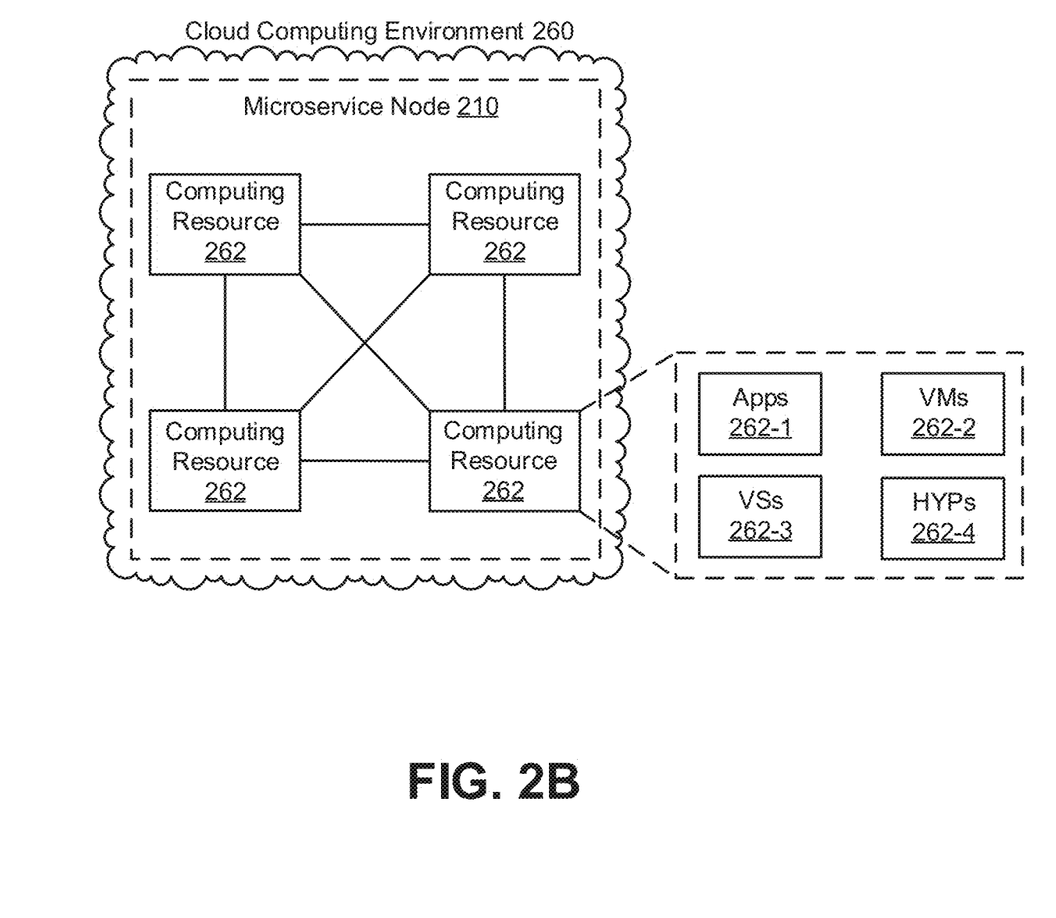

FIGS. 2A and 2B are diagrams associated with an example environment 200 in which systems and/or methods, described herein, can be implemented. As shown in FIG. 2A, environment 200 can include reference stations 205-1 through 205-A (A≥1) (herein referred to collectively as reference stations 205 and individually as reference station 205), a microservice node 210 (e.g., hosted in a cloud computing environment 260 and including a group of load balancers 225, a producer device 230, a queue device 235, a mapping device 240, a consumer device 245, and a location device 250), correction clients 215-1 through 215-B (B≥1) (herein referred to collectively as correction clients 215 and individually as correction client 215), location clients 220-1 through 220-C (C≥1) (herein referred to collectively as location clients 220 and individually as location client 220), and a network 255. Devices of environment 200 can interconnect via wired connections, wireless connections, or a combination of wired and wireless connections.

Reference station 205 includes one or more devices capable of receiving, generating, storing, processing, and/or providing information associated with a microservice provided by microservice node 210, as described herein. In some implementations, reference station 205 can include a base station. For example, reference station 205 can include an eNodeB associated with a Long Term Evolution (LTE) network, a gNodeB associated with a New Radio (NR) network, a base station associated with another type of radio access network (RAN), and/or the like, that receives information from and/or sends information to network 255. In some implementations, the base station, included in reference station 205, can send information to and/or receive information from corrections clients 215, location clients 220, microservice node 210, and/or the like, via an air interface. In some implementations, the base station can include a small cell base station, such as a base station of a microcell, a picocell, and/or a femtocell.

Additionally, reference station 205 can include a reference receiver capable of receiving, generating, storing, processing, and/or providing information, such as reference data microservice provided by microservice node 210, as described herein. For example, the reference receiver, included in reference station 205, can include a device, such as a computing device, with an antenna for receiving reference data. In some implementations, the reference receiver can receive information from and/or transmit information to microservice node 210 and/or one or more other devices.

In some implementations, reference station 205 can be a physical device. Additionally, or alternatively, reference station may be a virtual device. From the perspective of producer device 230, reference station 205 need only be an NTRIP client that is providing RTCM data. This client can be associated with a physical reference station 250 and/or a virtual reference station 205 that is providing a modified reference stream (e.g., based on some network modeling of the error environment).

Microservice node 210 includes a system (e.g., one or more devices) capable of providing a microservice to a corrections client 215 and/or a location client 220, as described herein. In some implementations, microservice node 210 can provide a microservice that provides an accuracy of location to within centimeters (hyper accuracy) for corrections client 215/location client 220 (which is not capable of being provided by GPS systems). In some implementations, microservice node 210 can enable corrections client 215/location client 220 to conserve resources (e.g., processor resources, battery power, memory resources, and/or the like) when, for example, corrections client 215/location client 220 does not need to continuously connect to a network, does not need to calculate hyper accurate location information, and/or the like. As shown in FIG. 2A, microservice node 210 include a group of load balancers 225, a producer device 230, a queue device 235, a mapping device 240, a consumer device 245, and a location device 250.

Load balancers 225 include devices to perform load balancing associated with provisioning of a microservice by one or more microservice nodes 210. For example, one or more load balancers 225 can be arranged to perform load balancing associated with balancing multiple reference data streams (e.g., provided by one or more reference stations 205) among multiple microservice nodes 210. As another example, one or more load balancers 225 can be arranged to perform load balancing associated with balancing reference data streams among multiple producer devices 230 of a given microservice node 210. As another example, one or more load balancers 225 can be arranged to perform load balancing associated with balancing traffic among multiple consumer devices 245 of a given microservice node 210. As another example, a load balancer 225 can be arranged to perform load balancing associated with balancing traffic among multiple location devices 250 of a given microservice node 210. As another example, a load balancer 225 can be arranged to perform load balancing associated with a group of corrections clients 215 and/or a group of location clients 220.

Producer device 230 includes a device arranged to receive, process, and/or provide reference data associated with one or more reference stations 205, as described herein. For example, producer device 230 can include a server, a group of servers, and/or the like. In some implementations, producer device 230 can be implemented using one or more computer resources of cloud computing environment 260.

Queue device 235 includes a device arranged to receive and process reference data from producer device 230, and store reference messages, corresponding to reference data, in message queues corresponding to reference stations 205, as described herein. For example, queue device 235 can include a server, a group of servers, and/or the like. In some implementations, queue device 235 can be implemented using one or more computer resources of cloud computing environment 260.

Mapping device 240 includes a device arranged to store mapping information associated with message queues of queue device 235 and/or perform one or more other management functions associated with microservice node 210, as described herein. For example, mapping device 240 can include a server, a group of servers, and/or the like. In some implementations, mapping device 240 can be implemented using one or more computer resources of cloud computing environment 260.

Consumer device 245 includes a device arranged receive a microservice request associated with a microservice to be provided to corrections client 215/location client 220, identify a message queue from which to obtain a reference message, obtain the reference message from the identified message queue, generate corrections data based on the reference message, and provide the reference data in association with providing the microservice, as described herein. For example, consumer device 245 can include a server, a group of servers, and/or the like. In some implementations, consumer device 245 can be implemented using one or more computer resources of cloud computing environment 260.

Location device 250 includes a device arranged to receive corrections data associated with a location microservice request, determine, based on the corrections data, an actual location of location client 220, and provide information that identifies the actual location of location client 220, as described herein. For example, location device 250 can include a server, a group of servers, and/or the like. In some implementations, location device 250 can be implemented using one or more computer resources of cloud computing environment 260.

In some implementations, environment 200 can include one or more microservice nodes 210, each of which can include one or more producer devices 230, one or more a queue devices 235, one or more mapping devices 240, one or more consumer devices 245, and/or one or more location devices 250, as described above. In some implementations, one or more microservice nodes 210 can form a hyper accuracy location platform associated with providing one or more microservices. In other words, one or more microservice nodes 210 can, collectively, operate as a hyper accuracy location platform such that microservices can be flexibly and efficiently provided to hundreds, thousands, or even millions of corrections clients 215 and/or location clients 220 based on reference data from hundreds or thousands of reference stations 205.

In some implementations, as shown, one or more components of microservice node 210 can be hosted in cloud computing environment 260. Notably, while implementations described herein describe microservice node 210 as being hosted in cloud computing environment 260, in some implementations, microservice node 210 is not cloud-based (i.e., can be implemented outside of a cloud computing environment) or can be partially cloud-based. Additional details regarding cloud computing environment 260 are described below with regard to FIG. 2B.

Correction client 215 includes one or more devices capable of receiving, generating, storing, processing, and/or providing information associated with a corrections microservice, as described herein. For example, corrections client 215 can include a device, such as a user device, a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a GPS device, a vehicle, an autonomous device, a sensor, a drone, a robotic device, and/or the like. In some implementations, corrections client 215 can receive information from and/or transmit information to another device in environment 200, such as microservice node 210 and/or reference station 205.

Location client 220 includes one or more devices capable of receiving, generating, storing, processing, and/or providing information associated with a location microservice, as described herein. For example, location client 220 can include a device, such as a user device, a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a GPS device, a vehicle, an autonomous device, a sensor, a drone, a robotic device, and/or the like. In some implementations, location client 220 can receive information from and/or transmit information to another device in environment 200, such as microservice node 210 and/or reference station 205.

Network 255 includes one or more wired and/or wireless networks. For example, network 255 can include a cellular network (e.g., a LTE network, a NR network, a 3G network, a CDMA network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

FIG. 2B is a diagram showing example components of cloud computing environment 260 in which one or more microservice nodes 210 can be configured. Cloud computing environment 260 includes an environment that delivers computing as a service, whereby shared resources, services, and/or the like, can be provided. Cloud computing environment 260 can provide computation, software, data access, storage, and/or other services that do not require end-user knowledge of a physical location and configuration of a system and/or a device that delivers the services. As shown, cloud computing environment 260 can include computing resources 262. In some implementations, one or more microservice nodes 210 and/or one or more components of a given microservice node 210 (e.g., load balancer 225, producer device 230, queue device 235, mapping device 240, consumer device 245, location device 250, and/or the like), can be implemented using computing resources 262 of cloud computing environment 260.

Computing resource 262 includes one or more servers, group of servers, computers, or others type of computation and communication devices. In some implementations, one or more computing resources 262 can be configured to operate as one or more components of one or more microservice nodes 210. Cloud resources can include compute instances executing in computing resource 262, storage devices provided in computing resource 262, data transfer devices provided by computing resource 262, etc. In some implementations, computing resource 262 can communicate with other computing resources 262 via wired connections, wireless connections, or a combination of wired and wireless connections.

As further shown in FIG. 2, computing resource 262 can include a group of cloud resources, such as one or more applications ("APPs") 262-1, one or more virtual machines ("VMs") 262-2, virtualized storage ("VSs") 262-3, one or more hypervisors ("HYPs") 262-4, or the like.

Application 262-1 includes one or more software applications that can be provided to or accessed by reference station 205, correction client 215, location client 220, and/or the like. Application 262-1 can eliminate a need to install and execute the software applications on these devices. For example, application 262-1 can include software associated with microservice node 210 and/or any other software capable of being provided via cloud computing environment 260. In some implementations, one application 262-1 can send/receive information to/from one or more other applications 262-1, via virtual machine 262-2.

Virtual machine 262-2 includes a software implementation of a machine (e.g., a computer) that executes programs like a physical machine. Virtual machine 262-2 can be, for example, a system virtual machine or a process virtual machine, depending upon use and degree of correspondence to any real machine by virtual machine 262-2. A system virtual machine can provide a complete system platform that supports execution of a complete operating system ("OS"). A process virtual machine can execute a single program, and can support a single process. In some implementations, virtual machine 262-2 can execute on behalf of a user (e.g., correction client 215 or location client 220), and can manage infrastructure of cloud computing environment 260, such as data management, synchronization, or long-duration data transfers. In some implementations, virtual machine 262-2 can be another type of virtual machine that provides another type of virtualization. For example, virtual machine 262-2 may be an OS-level virtual machine that provides OS-level virtualization (e.g., docker, LXC, workload partitions, etc.). Notably, while cloud resource 262 is shown as including virtual machine 262-2, cloud resource 262 may include another type of virtual device in some implementations, such as one or more containers.

Virtualized storage 262-3 includes one or more storage systems and/or one or more devices that use virtualization techniques within the storage systems or devices of computing resource 262. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 262-4 provides hardware virtualization techniques that allow multiple operating systems (e.g., "guest operating systems") to execute concurrently on a host computer, such as computing resource 262. Hypervisor 262-4 can present a virtual operating platform to the guest operating systems, and can manage the execution of the guest operating systems. Multiple instances of a variety of operating systems can share virtualized hardware resources.

In some implementations, one or more microservice nodes 210 and/or one or more components of a given microservice node 210 can be implemented in one or more cloud resources 262. For example, one or more microservice nodes 210 and/or one or more components of a given microservice node 210 can be implemented (as software) using one or more APPs 262-1, one or more VMs 262-2, and/or the like.

The number and arrangement of devices and networks shown in FIGS. 2A and 2B are provided as an example. In practice, there can be additional devices and/or networks, fewer devices and/or networks, different devices and/or networks, or differently arranged devices and/or networks than those shown in FIGS. 2A and 2B. Furthermore, two or more devices shown in FIGS. 2A and/or 2B can be implemented within a single device, or a single device shown in FIGS. 2A and/or 2B can be implemented as multiple, distributed devices. Additionally, or alternatively, a set of devices (e.g., one or more devices) of environment 200 can perform one or more functions described as being performed by another set of devices of environment 200.

Figure 3:
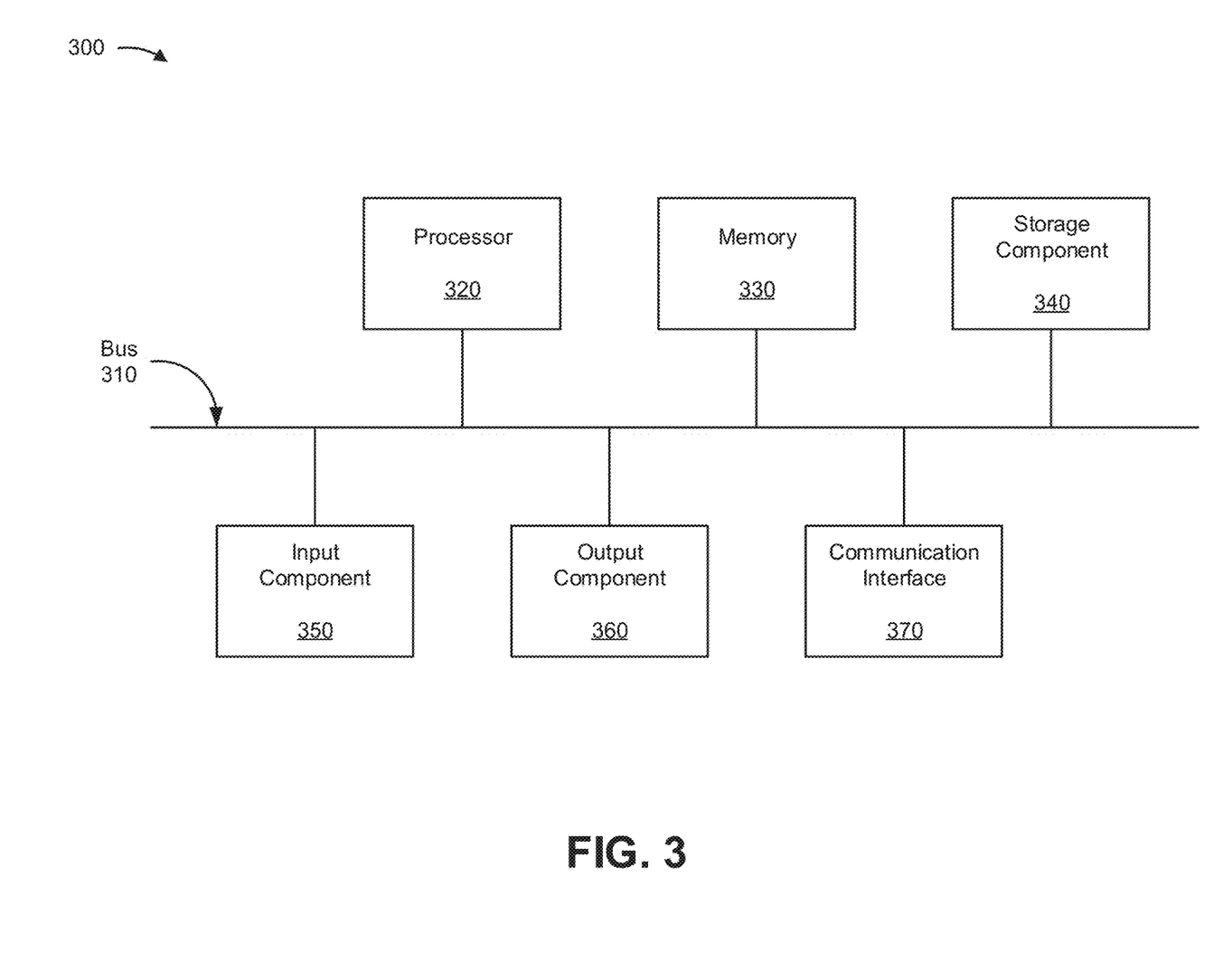
FIG. 3 is a diagram of example components of one or more devices of FIG. 2A or 2B.

FIG. 3 is a diagram of example components of a device 300. Device 300 can correspond to reference station 205, microservice node 210, correction client 215, location client 220, load balancer 225, producer device 230, queue device 235, mapping device 240, consumer device 245, location device 250, and/or computing resource 262. In some implementations, reference station 205, microservice node 210, correction client 215, location client 220, load balancer 225, producer device 230, queue device 235, mapping device 240, consumer device 245, location device 250, and/or computing resource 262 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a wireless local area network interface, a cellular network interface, or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
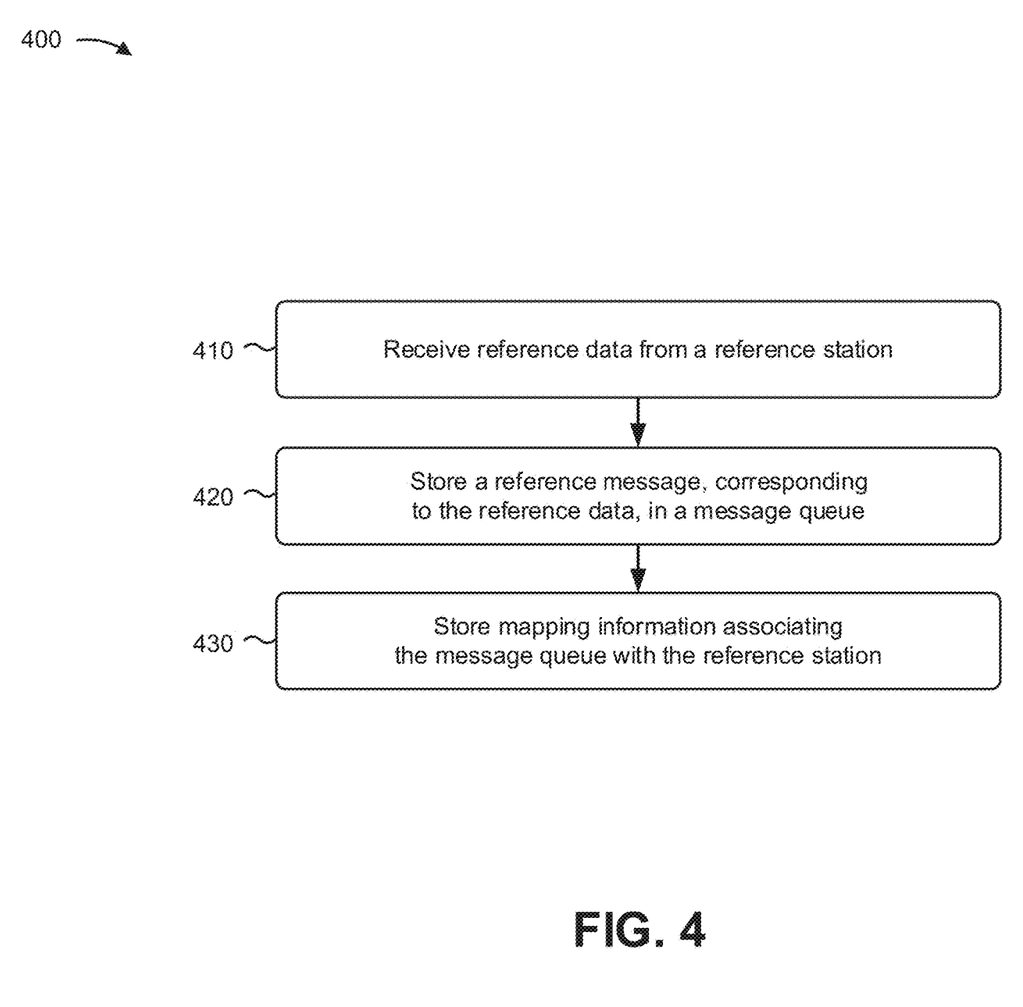
FIGS. 4 and 5 a flow charts of example processes associated with providing a microservice to client device.

FIG. 4 is a flow chart of an example process 400 for receiving and processing reference data associated with a reference station using a microservice node architecture described herein. In some implementations, one or more process blocks of FIG. 4 can be performed by one or more components of microservice node 210.

As shown in FIG. 4, process 400 can include receiving reference data from a reference station (block 410). For example, microservice node 210 (e.g., producer device 230) can receive reference data from reference station 205, as described herein.

As further shown in FIG. 4, process 400 can include storing a reference message, corresponding to the reference data, in a message queue (block 420). For example, microservice node 210 (e.g., queue device 235) can store a reference message, corresponding to the reference data, in a message queue, as described herein.

As further shown in FIG. 4, process 400 can include storing mapping information associating the message queue with the reference station (block 430). For example, microservice node 210 (e.g., mapping device 240) can store mapping information associating the message queue with the reference station, as described herein.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

Figure 5:
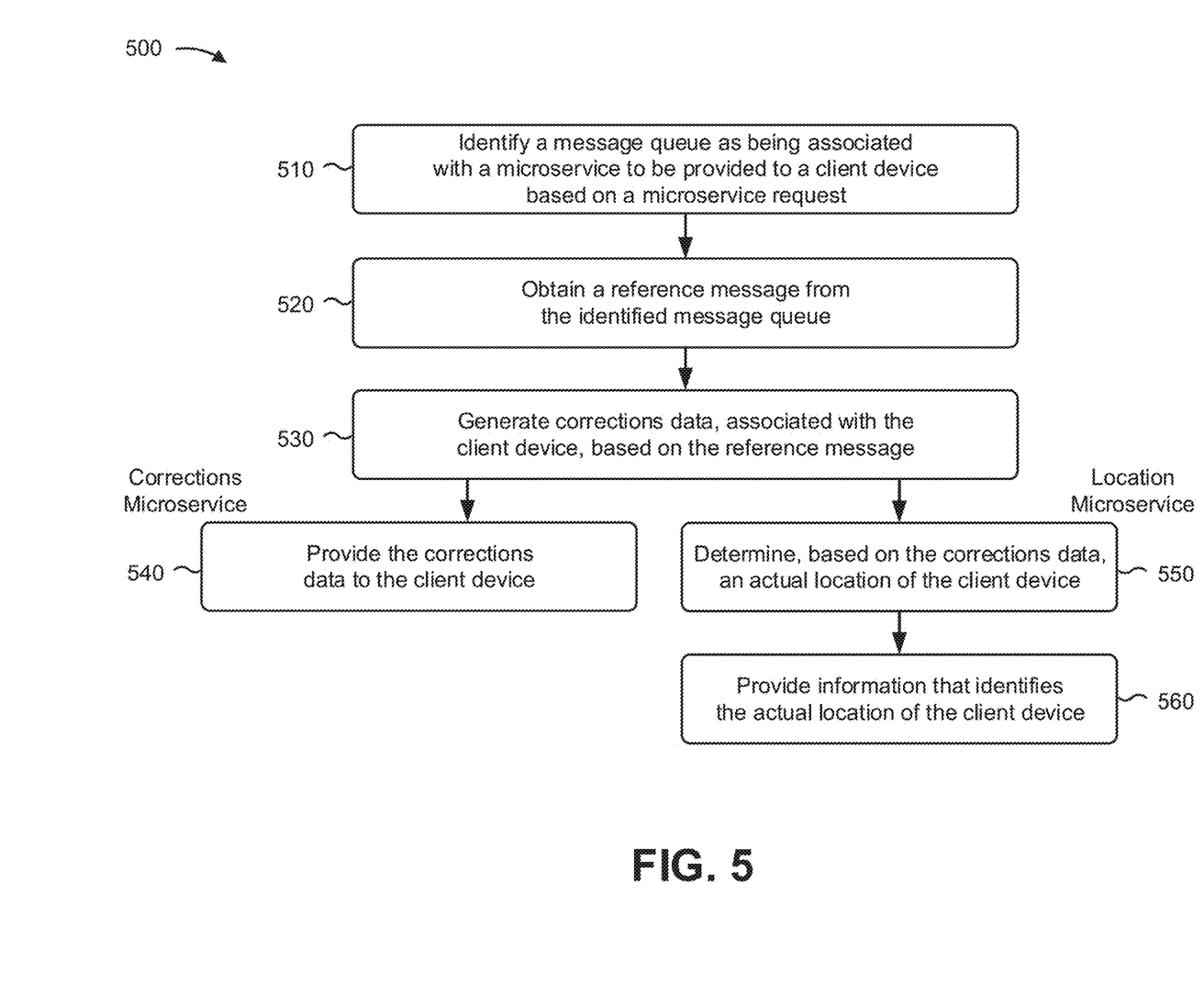

FIG. 5 is a flow chart of an example process 500 for providing a corrections microservice using a microservice node architecture described herein. In some implementations, one or more process blocks of FIG. 5 can be performed by one or more components of microservice node 210.

As shown in FIG. 5, process 500 can include identifying a message queue as being associated with a microservice to be provided to a client device based on a microservice request (block 510). For example, microservice node 210 (e.g., consumer device 245) can identify a message queue as being associated with a microservice to be provided to corrections client 215 (e.g., in the case of a microservice request associated with a corrections microservice) or location client 220 (e.g., in the case of a microservice request associated with a location microservice), as described herein.

As further shown in FIG. 5, process 500 can include obtaining a reference message from the identified message queue (block 520). For example, microservice node 210 (e.g., consumer device 245) can obtain a reference message from the identified message queue, as described herein.

As further shown in FIG. 5, process 500 can include generating corrections data, associated with the client device, based on the reference message (block 530). For example, microservice node 210 (e.g., consumer device 245) can generate corrections data, associated with corrections client 215 or location client 220, based on the reference message, as described herein.

As further shown in FIG. 5, when the microservice request is associated with a corrections microservice, process 500 can include providing the corrections data to the client device (block 540). For example, when the microservice is associated with a corrections microservice, microservice node 210 (e.g., consumer device 245) can provide the corrections data to corrections client 215, as described herein (e.g., such that corrections client 215 can determine an actual location of corrections client 215), as described herein. In some implementations, process 500 can return to block 520 (e.g., such that corrections client 215 can be provided with updated corrections data at a later time).

Additionally, or alternatively, as further indicated in FIG. 5, when the microservice request is associated with the location microservice, consumer device 245 can provide the corrections data to location device 250 (e.g., such that location device 250 can determine an actual location of location client 220), as described herein.

As further shown in FIG. 5, when the microservice request is associated with a location microservice, process 500 can include determining, based on the corrections data, an actual location of the client device (block 550). For example, when the microservice request is associated with the location microservice, microservice node 210 (e.g., location device 250) can determine, based on the corrections data, an actual location of location client 220, as described herein.

As further shown in FIG. 5, process 500 can include providing information that identifies the actual location of the client device (block 560). For example, when the microservice request is associated with the location microservice, microservice node 210 (e.g., location device 250) can provide information that identifies the actual location of location client 220 to location client 220, as described herein. In some implementations, process 500 can return to block 520 (e.g., such that location client 220 can be provided updated information that identifies the actual location of location client 220 at a later time).

In some implementations, location device 250 may be arranged to receive the corrections data associated with location client 220, determine, based on the corrections data, an actual location of location client 220, and provide, to location client 220, information that identifies the actual location of location client 220. In some implementations, consumer device 245 may be arranged to receive the microservice request from location device 250.

In some implementations, the corrections data may be provided to corrections client 215 to permit corrections client 215 to identify an actual location of corrections client 215 based on the corrections data. In some implementations, consumer device 245 may be arranged to receive the microservice request from corrections client 215.

In some implementations, consumer device 245 may identify reference station 205 as being a closest reference station to corrections client 215 or location client 220, and, when identifying the message queue as being associated with the microservice to be provided to corrections client 215 or location client 220 may identify the message queue based on identifying reference station 205 as being the closest reference station to corrections client 215 or location client 220.

In some implementations, the microservice is a corrections microservice or a location microservice.

Although FIG. 5 shows example blocks of process 500, in some implementations, process 500 can include additional blocks, fewer blocks, different blocks, or differently arranged blocks than those depicted in FIG. 5. Additionally, or alternatively, two or more of the blocks of process 500 can be performed in parallel.

Some implementations described herein provide a microservices architecture for a microservice node 210 that provides a sink for storing and/or processing reference station data and a source for providing corrections data or location data to a large scale, geographically distributed group of client devices (e.g., corrections clients 215 and/or location clients 220). In some implementations, the microservices architecture allows the various functions of a typical NTRIP caster to be independently scaled such that a number of microservices can be scaled independently and efficiently on the same (e.g., cloud-based) platform.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations can be described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, or the like.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A system comprising:
a location device, in a node hosted in a cloud computing environment, arranged to:
receive, from a consumer device in the node, corrections data associated with a microservice request from a client device,
the consumer device to generate the corrections data based on a reference message,
the reference message comprising reference data from a reference station,
information that identifies a location of the reference station is stored in a mapping device in the node, and
the microservice request associated with a microservice to be provided to the client device;
determine, based on the corrections data, an actual location of the client device; and
provide, to the client device, information that identifies the actual location of the client device without requiring the client device to determine the actual location.

2. The system of claim 1, where the consumer device is further arranged to:
receive the microservice request;
identify a message queue as being associated with the microservice to be provided to the client device based on the microservice request; and
obtain the reference message from the message queue.

3. The system of claim 2, where the consumer device is further arranged to:
change a subscription to a different message queue when location information associated with the client device indicates that the client device moved to a new geographic location.

4. The system of claim 1, where a queue device is further arranged to:
provide translation from Network Transport of RTCM via Internet Protocol (NTRIP) protocol to another format used by a microservice node.

5. The system of claim 1, where the microservice request includes information that identifies an observed location of the client device; and
the consumer device is further to:
identify the reference station that is within a threshold distance of the client device;
identify, based on mapping information, a message queue corresponding to the reference station; and
obtain the reference message.

6. The system of claim 1, where the actual location of the client device is determined based on the corrections data and one or more observables from the client device.

7. The system of claim 1, further comprising:
a producer device arranged to receive the reference data from the reference station.

8. A non-transitory computer-readable medium storing instructions, the instructions comprising:
one or more instructions that, when executed by one or more processors of a location device in a node hosted in a cloud computing environment, cause the one or more processors to:
receive, from a consumer device in the node, corrections data associated with a microservice request from a client device,
the consumer device to generate the corrections data based on a reference message,
the reference message comprising reference data from a reference station,
information that identifies a location of the reference station is stored in a mapping device in the node, and
the microservice request associated with a microservice to be provided to the client device;
determine, based on the corrections data, an actual location of the client device; and
provide, to the client device, information that identifies the actual location of the client device without requiring the client device to determine the actual location.

9. The non-transitory computer-readable medium of claim 8, where the one or more instructions, when executed by the one or more processors, further cause the one or more processors to:
identify a message queue as being associated with the microservice to be provided to the client device based on the microservice request, and
obtain the reference message from the message queue.

10. The non-transitory computer-readable medium of claim 9, where the one or more instructions, when executed by the one or more processors, further cause the one or more processors to:
change a subscription to a different message queue when location information associated with the client device indicates that the client device moved to a new geographic location.

11. The non-transitory computer-readable medium of claim 8, where the one or more instructions, when executed by the one or more processors, further cause the one or more processors to:
provide translation from Network Transport of RTCM via Internet Protocol (NTRIP) protocol to another format used by a microservice node.

12. The non-transitory computer-readable medium of claim 8, where the microservice request includes information that identifies an observed location of the client device; and
where the one or more instructions, when executed by the one or more processors, further cause the one or more processors to:
identify the reference station that is within a threshold distance of the client device;
identify, based on mapping information, a message queue corresponding to the reference station; and
obtain the reference message.

13. The non-transitory computer-readable medium of claim 8, where the actual location of the client device is determined based on the corrections data and one or more observables from the client device.

14. The non-transitory computer-readable medium of claim 8, where the microservice is a corrections microservice or a location microservice.

15. A method, comprising:
receiving, by a location device in a microservice node, hosted in a cloud computing environment, and from a consumer device in the microservice node, corrections data associated with a microservice request from a client device,
the consumer device to generate the corrections data based on a reference message,
the reference message comprising reference data from a reference station,
information that identifies a location of the reference station is stored in a mapping device in the microservice node, and
the microservice request associated with a microservice to be provided to the client device;
determining, by the location device and based on the corrections data, an actual location of the client device; and
providing, by the location device and to the client device, information that identifies the actual location of the client device without requiring the client device to determine the actual location.

16. The method of claim 15, further comprising:
identifying, by the consumer device, a message queue as being associated with the microservice to be provided to the client device based on the microservice request; and
obtaining, by the consumer device, the reference message from the message queue.

17. The method of claim 16, further comprising:
changing, by the consumer device, a subscription to a different message queue when location information associated with the client device indicates that the client device moved to a new geographic location.

18. The method of claim 15, further comprising:
providing, by a queue device, a translation from Network Transport of RTCM via Internet Protocol (NTRIP) protocol to another format used by the microservice node.

19. The method of claim 15, where the microservice request includes information that identifies an observed location of the client device; and
the method further comprising:
identifying, by the consumer device, the reference station that is within a threshold distance of the client device;
identifying, by the consumer device and based on mapping information, a message queue corresponding to the reference station; and
obtaining, by the consumer device, the reference message.

20. The method of claim 15, further comprising:
receiving, by the consumer device, the microservice request from the location device.

* * * * *